US012625507B2

(12) United States Patent
Melmoth et al.

(10) Patent No.: US 12,625,507 B2
(45) Date of Patent: May 12, 2026

(54) SYSTEM AND METHOD FOR TILT DEAD RECKONING

(71) Applicant: 4596286 Manitoba Ltd, Stony Mountain (CA)

(72) Inventors: Tyler Desmond Melmoth, Winnipeg (CA); Howard William Loewen, Winnipeg (CA)

(73) Assignee: 4596286 Manitoba Ltd, Stony Mountain (CA)

( * ) Notice: Subject to any disclaimer, the term of this patent is extended or adjusted under 35 U.S.C. 154(b) by 47 days.

(21) Appl. No.: 18/987,115

(22) Filed: Dec. 19, 2024

(65) Prior Publication Data

US 2025/0130596 A1 Apr. 24, 2025

Related U.S. Application Data

(63) Continuation-in-part of application No. 17/701,934, filed on Mar. 23, 2022, now abandoned.

(60) Provisional application No. 63/165,206, filed on Mar. 24, 2021.

(51) Int. Cl.
| | |
|---|---|
| *G05D 1/85* | (2024.01) |
| *G05D 1/245* | (2024.01) |
| *G05D 109/25* | (2024.01) |

(52) U.S. Cl.
CPC .............. *G05D 1/85* (2024.01); *G05D 1/245* (2024.01); *G05D 2109/25* (2024.01)

(58) Field of Classification Search
CPC ...... G05D 1/85; G05D 1/245; G05D 2109/25; G05D 2111/52; G05D 1/49
See application file for complete search history.

(56) References Cited

U.S. PATENT DOCUMENTS

| | | | |
|---|---|---|---|
| 4,766,767 | A | 8/1988 | Hassenpflug et al. |
| 8,936,212 | B1 | 1/2015 | Fu |
| 2004/0024500 | A1 | 2/2004 | Campbell |
| 2008/0077284 | A1* | 3/2008 | Swope .................. G05D 1/106 |
| | | | 701/4 |

(Continued)

FOREIGN PATENT DOCUMENTS

WO         2020051757         3/2020

OTHER PUBLICATIONS

"GPS-Denied Navigation on Small Unmanned Helicopters: Challenges and Solutions" obtained online Jul. 2020 [https://alphaunmannedsystems.com/2019/01/08/gps-denied-navigation-on-small-unmanned-helicopters-challenges-and-solutions/]; 2 pages.

(Continued)

*Primary Examiner* — Anne Marie Antonucci
*Assistant Examiner* — Misa H Nguyen
(74) *Attorney, Agent, or Firm* — Miltons IP/p.i.

(57) ABSTRACT

A system and method for tilt dead reckoning is provided. The system and method allows an autopilot of an unmanned aerial vehicle (UAV) to perform dead reckoning with a hovering vehicle during GNSS signal loss by estimating the position and velocity of the vehicle based on its pitch and roll angles and known vehicle dynamics. The position and velocity are estimated using tables set up by a UAV integration engineer that provide the expected airspeed at given pitch and roll angles in steady state. This allows the UAV to attempt to follow waypoints when GNSS signal is lost without using any additional sensors.

13 Claims, 6 Drawing Sheets

(56) References Cited

U.S. PATENT DOCUMENTS

| 2015/0057844 A1 | 2/2015 | Callou |
| 2015/0197335 A1 | 7/2015 | Dekel et al. |
| 2015/0202540 A1 | 7/2015 | Erhart et al. |
| 2017/0349277 A1 | 12/2017 | Erhart |
| 2019/0376997 A1 | 12/2019 | El-Sheimy et al. |
| 2020/0141969 A1 | 5/2020 | Zhang et al. |
| 2020/0148387 A1 | 5/2020 | Johansen |
| 2020/0233439 A1 | 7/2020 | Ivanov |

OTHER PUBLICATIONS

Machine Translated WO-2020051757-A1 (Year: 2020).

\* cited by examiner

Filter for Estimating Velocity from Wind Estimate and Tilt Angles

FIG. 4

SYSTEM AND METHOD FOR TILT DEAD RECKONING

TECHNICAL FIELD

The present application relates to a dead reckoning system and method. More particularly, the present application relates to a tilt dead reckoning system and method for unmanned aerial vehicles (UAV).

BACKGROUND

Unmanned aerial vehicles (UAV) are generally any aircraft that is does not have an onboard human pilot. UAVs may be of various sizes and configurations, including hovering and non-hovering vehicles. UAVs may be fully autonomous or may be controlled wholly or in part by a human operator. UAVs may also include (and be referred to as) drones, unmanned aerial systems (UAS) and remotely piloted aerial systems (RPAS). Conventional solutions for calculating dead reckoning of UAVs use inertial navigation where onboard gyros and accelerometers measure the UAV's angular rotation rate and acceleration. The angular rate is integrated over time to give an estimate of the UAV's orientation, which may be corrected by measurements from the accelerometers or other sources. The acceleration from the accelerometers is transformed to the world frame using the orientation estimate, the estimated gravity vector is subtracted and the result is integrated over time to give a velocity estimate, and the velocity estimate is integrated over time to give a position estimate. One problem with inertial navigation is that errors in the estimated orientation or measured acceleration cause the error in position to increase with the cube or square of time, so a small error in acceleration or orientation can quickly lead to a very large position error.

US20150197335 discusses a control system configured to control an acceleration of an air vehicle which comprises a tiltable propulsion unit that is tiltable to provide a thrust whose direction is variable at least between a general vertical thrust vector direction and a general longitudinal thrust vector direction with respect to the air vehicle.

US20200141969 discusses a method of determining airspeed of a movable object, the method includes performing a calibration process to determine a relationship between forces exerted on the movable object and airspeed of the movable object, determining forces exerted on the movable object while the movable object is moving, and determining an airspeed of the movable object based on the determined forces and the relationship.

US20150202540 discusses a hand-held radio transmit controller for remotely controlling an aircraft, and a method for controlling a remote control aircraft offering ground vehicle-like control.

The following are examples of situations and environments that need an improved system and method of dead reckoning.

Example 1: Global navigation satellite system (GNSS) signal intentionally blocked at a factory. A multirotor is flying around a factory checking the perimeter as a result of a security alarm. As it reaches the northwest corner of the factory GNSS reception is lost due to a GNSS jammer placed on the ground by the intruders. The operator takes control in a camera guide mode, completes the inspection manually and identifies the location of the GNSS jammer. The operator then switches the multirotor back to autonomous mode. The multirotor still does not have GNSS signal and so it enters hover dead reckoning mode and heads towards its ditch location. Halfway to the ditch location it is beyond the range of the jammer and so GNSS reception is regained and the multirotor returns home and lands.

Example 2: Multirotor loses GNSS reception due to a hardware fault. A multirotor is flying around a factory checking emissions. A permanent fault in the GNSS receiver causes a loss of GNSS position and velocity information. The vehicle hovers for a few seconds to see if the GNSS signal will be reacquired. When it does not reacquire the GNSS signal, the multirotor enters hover dead reckoning mode. The multirotor flies to its ditching point a kilometer from the factory. As the multirotor approaches the ditching point, the autopilot pitches up to slow down and stop. The multirotor then starts a slow descent while holding the appropriate pitch and roll for zero velocity. During the descent the velocity of the multirotor starts to slow but it does not stop before it reaches the ground. Six inches above the ground the autopilot cuts complete power to the motors. The multirotor drops to the ground and tips over causing minor damage.

Example 3: Helicopter loses GNSS signal over a city due to hardware fault. An autonomous helicopter is flying over a city when it loses GNSS signal. The helicopter enters hover dead reckoning mode and starts flying towards its ditching location twenty kilometers away at a speed of 40 kilometers an hour. After a half hour flight, it reaches its ditching location, descends to an altitude where it will cut the engine. Once the engine is stopped the helicopter falls to the ground at a safe location.

Example 4: Helicopter loses GNSS signal over city and lands on the top of the building. A helicopter is flying over a city when it loses GNSS signal. The operator identifies a safe landing location on the top of a local store and initiates a descent towards that location. Using a camera guide mode, whereby the UAV flies in the direction the camera is pointed, she guides the helicopter towards that safe landing location. Ten seconds before touchdown the helicopter descends to an altitude below which the radio signal to the operator is blocked by another building and communication with the vehicle is lost. The autopilot uses hover dead reckoning to continue towards the safe landing zone identified by the operator and completes the landing.

SUMMARY

A system and method for tilt dead reckoning is provided. The system and method allows the autopilot of an unmanned aerial vehicle (UAV) to perform dead reckoning with a hovering vehicle during GNSS signal loss by estimating the position and velocity of the vehicle based on its pitch and roll angles and known vehicle dynamics.

In the present application, UAVs may be of various sizes and configurations, including hovering and non-hovering vehicles. UAVs may be fully autonomous or may be controlled wholly or in part by a human operator. UAVs may also include (and be referred to as) drones, unmanned aerial systems (UAS) and remotely piloted aerial systems (RPAS).

The velocity is estimated using tables stored in the autopilot that provide the expected airspeed at given pitch and roll angles in steady state or formulas. The tables are set up by a UAV integration engineer when the various systems comprising the UAV's control system are installed into the UAV. This estimated velocity and position allows the UAV to navigate to waypoints, albeit with less accuracy, when GNSS signal is lost without using any additional sensors, other than an inertial measurement unit (IMU).

An autopilot with algorithm for global navigation satellite system (GNSS) denied navigation for UAVs is provided, wherein the algorithm allows performing dead reckoning for the UAV while it is hovering, moving at a constant speed, or accelerating. A UAV integration engineer configures two tables: the first translates the UAV's pitch into an expected steady state airflow velocity over its X axis and the second translates the UAV's roll into an expected steady state airflow velocity over the UAV's Y axis. An expected steady state airflow velocity for the UAV can be determined using the UAV's measured pitch and roll angles to lookup, in these two tables, an expected steady-state airflow velocity in the vehicle's fixed coordinate system. Instantaneous wind estimates are made, while GNSS signal is present, when the UAV is either hovering or moving at a constant speed, by determining the expected airflow velocity, transforming the expected airflow velocity into the world coordinate system and then subtracting the velocity measured by the GNSS. Velocity and position measurements from the GNSS are estimates. An improved wind estimate can be calculated by applying a low-pass filter to the instantaneous wind estimates.

If GNSS reception is lost, the most recent wind estimate, recorded before GNSS reception was lost, is transformed to the vehicle fixed coordinate frame and added to the previous body velocity estimate, to get the airflow velocity estimate in the vehicle fixed coordinate frame. The airflow velocity estimate is converted to pitch and roll angles, to estimate the pitch and roll angles required to counteract drag, using the said tables configured by a UAV integration engineer. The pitch and roll angles required to counteract drag are subtracted from the vehicle's pitch and roll angles to give the pitch and roll angles contributing to acceleration.

Lateral acceleration is calculated from the pitch and roll angles contributing to acceleration and a measurement of the thrust from the vertical acceleration. The lateral acceleration is then transformed to the world frame of reference and integrated to give a world velocity estimate. The world velocity estimate is then integrated to give a world position estimate.

A dead reckoning estimate, of the current position and velocity, is performed wherein the dead reckoning estimate for current position and velocity is based on: tilt angles which includes pitch angle and roll angle, tables to convert the airflow velocities to pitch and roll angles required to counteract drag, estimated lateral acceleration from subtracting the pitch and roll angles required to counteract drag from the pitch and roll angles of the vehicle, wind estimate, and previous velocity estimate.

A default table, developed from either a single generic UAV or a range of UAVs, may be provided instead of one or more tables configured by UAV integration engineer for a particular UAV. The default table provides less accurate data than the tables configured for a particular UAV.

Wind estimates are made from airflow velocities, while GNSS signal is still present, by converting them from vehicle fixed coordinate frame into world frame and then subtracting the world velocity. Instantaneous wind estimate accuracy is improved by adjusting the pitch and roll values to use for the airflow velocity table based on the current acceleration the vehicle is experiencing. In other embodiments, the wind estimate may be from an external source such as an online weather service or a wind station located at a ground control station.

An airflow estimate, in vehicle fixed coordinate frame, is obtained by transforming the airflow estimate in world frame, which is obtained by adding previous velocity estimate to the wind estimate. The Kalman Filter tilt measurements are aided by subtracting the body acceleration estimate from the accelerometer values when GNSS signal is lost.

There is provided a method of dead reckoning for GNSS denied navigation of unmanned aerial vehicles (UAV), the method comprising determining a wind estimate, transforming the wind estimate from a world frame to a body frame, adding a desired body velocity to the wind estimate in the body frame to determine a desired airflow velocity; and converting the desired airflow velocity to desired pitch and roll angles. The method may further include adding pitch and roll angles for acceleration to the desired pitch and roll angles, where the wind estimate is determined from pitch and roll angles.

In another aspect, there is provided a method of determining a wind estimate, while GNSS signal is present, from pitch and roll angles, the method comprising converting pitch and roll angles to an estimated airflow velocity in a body frame, transforming the estimated airflow velocity to a world frame, subtracting a velocity estimate in the world frame from the estimated airflow velocity in the world frame to determine the wind estimate in the world frame, and applying a low-pass filter to the wind estimate to determine a filtered wind estimate. Where in the method the wind estimate is based on the estimated airflow velocity when the UAV is hovering, moving at a constant speed or accelerating.

In another aspect, there is provided a method of dead reckoning for GNSS denied navigation of unmanned aerial vehicles (UAV), the method comprising adding a previous velocity estimate in a world frame to a current wind estimate to determine an airflow velocity estimate; transforming the airflow velocity estimate from the world frame to a body frame; converting the airflow velocity estimate to pitch and roll angles to determine the pitch and roll angles required for counteracting drag; subtracting the pitch and roll angles for counteracting drag from the UAV's current pitch and roll angles to determine pitch and roll angles contributing to acceleration; calculating lateral acceleration from the pitch and roll angles contributing to acceleration and from a measurement of the thrust from the vertical acceleration, transforming the lateral acceleration to the world frame; integrating the lateral acceleration in the world frame to determine a world frame velocity estimate; integrating the world frame velocity estimate to determine a world position estimate. The method is performed while the UAV is hovering, moving at a constant speed, or accelerating. The method may further include configuring a table with expected airflow velocity in a body frame, for different pitch and roll angles, wherein the table is used to convert airflow velocity to corresponding pitch and roll angles and to convert pitch and roll angles to corresponding airflow velocity, and configuring a first table for the X-axis and a second table for the Y-axis.

In another aspect, there is provided a method of dead reckoning for GNSS denied navigation of unmanned aerial vehicles (UAV), the method comprising: determining a wind estimate in world coordinates; determining the UAV's pitch and roll; converting the UAV's estimated X and Y body velocities, added to X and Y body wind velocities, into a drag acceleration using one or more tables or formulas; calculating an acceleration from the determined UAV pitch and roll angles and then subtracting the drag acceleration; integrating the acceleration into a change in velocity; updating the velocity estimate by adding the change in velocity; and integrating the velocity, converted into world frame, to obtain a position estimate. The method where the drag acceleration is calculated from pitch and roll using one table or formula for both X and Y body velocities. In other embodiments, the method where the drag acceleration is calculated from pitch and roll using two tables or formula, one for the X body velocity and a second for the Y body velocity.

In another aspect, there is provided a dead reckoning method of a current position and velocity of a unmanned aerial vehicle (UAV), the method comprising: determining current pitch and roll angles of the UAV; converting, using tables, airflow velocities to pitch and roll angles required to counteract drag; and estimating lateral acceleration by subtracting the pitch and roll angles required to counteract drag from the current pitch and roll angles of the UAV, where the pitch and roll angles required to counteract drag come from a wind estimate, and a previous velocity estimate. The tables are configured with expected airflow velocity in a body frame, and for different pitch and roll angles. In other embodiments, the tables may be default tables. The wind estimate may be determined from airflow velocities by converting the airflow velocities from the body frame into the world frame and then subtracting the world velocity. The instantaneous wind estimate accuracy may be improved by adjusting the pitch and roll angles that are used for the airflow velocity table based on the current acceleration the UAV is experiencing. The airflow velocity estimate in the body frame is obtained by transforming airflow estimate in the world frame, and wherein the airflow estimate in the world frame is determined by adding previous velocity estimate to the wind estimate.

In another aspect, there is provided a method of dead reckoning for GNSS denied navigation of unmanned aerial vehicles (UAV), the method comprising: determining a wind estimate in world coordinates; determining the UAV's pitch and roll; converting the UAV's estimated X and Y body velocities, added to X and Y body wind velocities converted to body axis, into a lateral equilibrium force using one or more tables or formulas; calculating a lateral acceleration; integrating the lateral acceleration into a change in velocity; updating the velocity estimate by adding the change in velocity converted into world coordinates; and integrating the velocity to obtain a position estimate. The lateral equilibrium force is the force that, for a particular velocity, counteracts the UAV's drag at that velocity so the vehicle neither accelerates nor decelerates. In an embodiment, the step of calculating the lateral body X and body Y accelerations includes calculating lateral acceleration from the determined UAV pitch and roll angles and then subtracting the respective body X and body Y lateral equilibrium force converted into an acceleration using the UAV's mass. In other embodiments, the step of calculating the lateral acceleration includes: calculating a lateral force from the determined UAV pitch angle, roll angle and UAV mass, and then subtracting the lateral equilibrium force; converting the resulting lateral force into a lateral acceleration by dividing by the UAV mass.

The lateral equilibrium force is the component of the force acting on the UAV that is parallel to the ground that, for a particular velocity and where altitude remains constant, exactly counteracts the proportion of the UAV's drag that is parallel to the ground. Like all forces the lateral equilibrium force has a direction and magnitude and can be decomposed into perpendicular forces aligned with various reference frames such as the vehicle's body frame (or body axis) or the world frame (or world axis i.e. North and East). When the UAV is tilted at an angle where the component of the vehicle's lifting force equals the lateral equilibrium force, the UAV neither accelerates nor decelerates. The lateral equilibrium force increases with velocity because drag increases with velocity.

In another aspect, there is provided a method of dead reckoning for GNSS denied navigation of unmanned aerial vehicles (UAV), the method comprising: determining a wind estimate in world coordinates; measuring the UAV's pitch and roll; converting the UAV's estimated X and Y body velocities, added to X and Y body wind velocities, into an equilibrium pitch and roll using two tables or formulas; calculating an excess pitch and roll by subtracting the calculated equilibrium pitch and roll from measured pitch and roll; calculating an acceleration from the excess pitch and roll; integrating the acceleration into a change in velocity; updating the velocity estimate by adding the change in velocity; and integrating the velocity to obtain a position estimate.

In another aspect, there is provided a method of dead reckoning for GNSS denied navigation of a hovering unmanned aerial vehicle (UAV) where the vehicle flies using a method of generating force to counteract gravity, typically one or more rotors, aligned with the vehicle's Z-axis that control lateral velocity and position by tilting the UAV towards the desired direction of travel, the method comprising: determining a wind estimate in world coordinates; determining the UAV's pitch and roll; converting the UAV's estimated X and Y body velocities, added to X and Y body wind velocities converted to body axis, into a lateral equilibrium force using one or more tables or formulas; calculating a lateral acceleration; integrating the lateral acceleration into a change in velocity; updating the velocity estimate by adding the change in velocity converted into world coordinates; and integrating the velocity to obtain a position estimate. The lateral equilibrium force is the force that, for a particular velocity, counteracts the UAV's drag at that velocity so the vehicle neither accelerates nor decelerates. In an embodiment, the step of calculating the lateral acceleration includes calculating lateral acceleration from the determined UAV pitch and roll angles and then subtracting the lateral equilibrium force converted into an acceleration using the UAV's mass. In other embodiments, the step of calculating the lateral acceleration includes: calculating a lateral force from the determined UAV pitch angle, roll angle and UAV mass, and then subtracting the lateral equilibrium force; converting the resulting lateral force into a lateral acceleration by dividing by the UAV mass.

In another aspect, there is provided an unmanned aerial vehicle (UAV), the UAV comprising a processor; a memory for storing one or more tables having expected airflow velocity in a body frame for different pitch and roll angles; the processor being configured to: determine a wind estimate in world coordinates; determine the UAV's pitch and roll; convert the UAV's estimated X and Y body velocities, added to X and Y body wind velocities, into a drag acceleration using one or more tables or formulas; calculate an acceleration from the determined UAV pitch and roll angles and then subtracting the drag acceleration; integrating the acceleration into a change in velocity; update the velocity estimate by adding the change in velocity converted into world coordinates; and integrate the velocity to obtain a position estimate.

Thus, in one aspect, there is provided a method of dead reckoning for GNSS denied navigation of unmanned aerial vehicles (UAV), the method comprising: determining a wind estimate in world coordinates; determining the UAV's pitch and roll; converting the UAV's estimated X and Y body velocities, added to X and Y body wind velocities converted into body axis, into a equilibrium pitch and roll using table(s) or formula(s); calculating an UAV acceleration by calculating an acceleration based from the determined UAV pitch and roll angles and subtracting the acceleration calculated from the equilibrium pitch and roll; integrating the acceleration into a change in velocity; updating the velocity estimate by adding the change in velocity; and integrating the velocity to obtain a position estimate.

In another aspect, there is provided a method of dead reckoning for GNSS denied navigation of unmanned aerial vehicles (UAV), the method comprising: determining a wind estimate in world coordinates; measuring the UAV's pitch and roll; converting the UAV's estimated X and Y body velocities, added to X and Y body wind velocities, into a equilibrium-acceleration pitch and roll using two tables or formulas; calculating an excess pitch and roll by subtracting the measured calculated equilibrium-acceleration pitch and roll from measured pitch and roll; calculating an acceleration from the excess pitch and roll; integrating the acceleration into a change in velocity; updating the velocity estimate by adding the change in velocity; and integrating the velocity to obtain a position estimate.

In another aspect, there is provided a method of dead reckoning for GNSS denied navigation of unmanned aerial vehicles (UAV), the method comprising: determining a wind estimate; determining the UAV's pitch and roll; converting the UAV's estimated velocity, added to the wind velocity, into a lateral equilibrium force using one or more tables or formulas; calculating a lateral acceleration; integrating the lateral acceleration into a change in velocity; updating the velocity estimate by adding the change in velocity; and integrating the velocity to obtain a position estimate.

In another aspect, there is provided a method of dead reckoning for GNSS denied navigation of unmanned aerial vehicles (UAV), the method comprising: determining a wind estimate; measuring the UAV's pitch and roll; converting the UAV's estimated velocity, added to the wind velocity, into an equilibrium pitch and roll using two tables or formulas; calculating an excess pitch and roll by subtracting the calculated equilibrium pitch and roll from measured pitch and roll; calculating an acceleration from the excess pitch and roll; integrating the acceleration into a change in velocity; updating the velocity estimate by adding the change in velocity; and integrating the velocity to obtain a position estimate.

In another aspect, there is provided an unmanned aerial vehicle (UAV), the UAV comprising: a processor; a memory for storing one or more tables having expected airflow velocity for different pitch and roll angles; the processor being configured to: determine a wind estimate; determine the UAV's pitch and roll; convert the UAV's estimated velocity, added to the wind velocity, into a drag acceleration using one or more tables or formulas; calculate an acceleration from the determined UAV pitch and roll angles and then subtracting the drag acceleration; integrate the acceleration into a change in velocity; update the velocity estimate by adding the change in velocity; and integrate the velocity to obtain a position estimate.

In another aspect, there is provided a method of dead reckoning for GNSS denied navigation of unmanned aerial vehicles (UAV), the method comprising: determining a wind estimate; determining the UAV's pitch and roll; converting the UAV's estimated velocity, added to the wind velocity using consistent frames of reference, into a lateral equilibrium force using one or more tables or formulas; calculating a lateral acceleration from the determined UAV pitch and roll angles and then subtracting the lateral equilibrium force converted into an acceleration using the UAV mass; integrating the lateral acceleration into a change in velocity using consistent frames of reference; updating the velocity estimate by adding the change in velocity using consistent frames of reference; and integrating the velocity to obtain a position estimate.

In another aspect, there is provided a method of hovering dead reckoning for GNSS (Global Navigation Satellite System) denied navigation of unmanned aerial vehicles (UAV) having fixed lifting rotors, the method comprising: determining a wind velocity; determining the UAV's pitch and roll; the UAV's estimated velocity, added to the wind velocity, into a lateral equilibrium force using one or more tables or formulas; calculating a lateral acceleration of the UAV; integrating the lateral acceleration into a change in velocity of the UAV; updating the UAV's velocity estimate by adding the change in velocity of the UAV; integrating the UAV's updated velocity to obtain a position estimate of the UAV; providing the position estimate of the UAV to a navigation system; and controlling the UAV using the position estimate.

The calculation of the acceleration can be implemented in multiple ways. One of them is the subtraction of angles. Another method would be to calculate the lateral thrust generated by the UAV's estimated pitch and roll angles, calculate the lateral thrust generated by the equilibrium pitch and roll values, and calculate the acceleration by subtracting those two values. It is also possible to include the vertical acceleration in either calculation to make it more accurate if the UAV is accelerating vertically. The UAV's vertical acceleration can be determined directly from accelerometers in an IMU after transforming the IMU acceleration from body axis to world axis. The accuracy of the vertical acceleration can be improved by using a pressure altitude sensor to correct long term accelerometer zero bias drift in the Z acceleration estimate.

In another aspect, there is provided a non-transitory computer readable medium having instructions stored thereon, which when executed by a processor for determining dead reckoning, the processor being configured to perform any of the methods of the present application.

BRIEF DESCRIPTION OF THE DRAWINGS

FIG. 4 is a flow chart of a method of estimating velocity from wind estimate and tilt angles in accordance with one example embodiment of the present disclosure.

DETAILED DESCRIPTION

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

The system and methods of the present application provide a mode where an UAV can navigate during periods of Global Navigation Satellite System (GNSS) outage while keeping the position and velocity error within acceptable limits. Examples of GNSS systems includes for example GPS and Galileo. An example of a use for this mode would be a UAV operating over an area where it is not able to land. If GNSS is lost, the UAV will be able to navigate to a safe landing/ditching area with sufficient accuracy. Once the UAV reaches the area, it can shut down the engine and ditch the UAV, or it can use another guidance method such as a vision system to land.

The methods of the present application assume that the UAV is a hovering vehicle that will have a constant and predictable equilibrium pitch or roll angle for a given airflow velocity in steady state. Furthermore, the methods described herein are applicable to UAVs with fixed lifting rotors, i.e. with lifting rotors that do not rotate with respect to the UAV, while the UAV is hovering. In particular, the methods described herein are applicable to UAVs that vector their lifting thrust in order to move (i.e. helicopters or multirotors). In at least one of its flight modes, the UAV navigates by controlling its pitch and roll in order to tilt its lifting force in the direction it is commanded to move. Position and velocity information are necessary to fly a hovering vehicle, moreover in some embodiments both position and velocity information are generally needed at an update rate greater than 10 Hz with a latency of less than 100 msec for proper operation of the UAV.

An advantage of the present methods as compared to inertial navigation is that the position error will increase linearly with time instead of with the square of time that occurs with inertial navigation. Another advantage of the present methods compared to conventional solutions of holding constant pitch and roll angles during GNSS loss is that with the methods of the present application navigation can be attempted, even with degraded accuracy.

Figure 1:
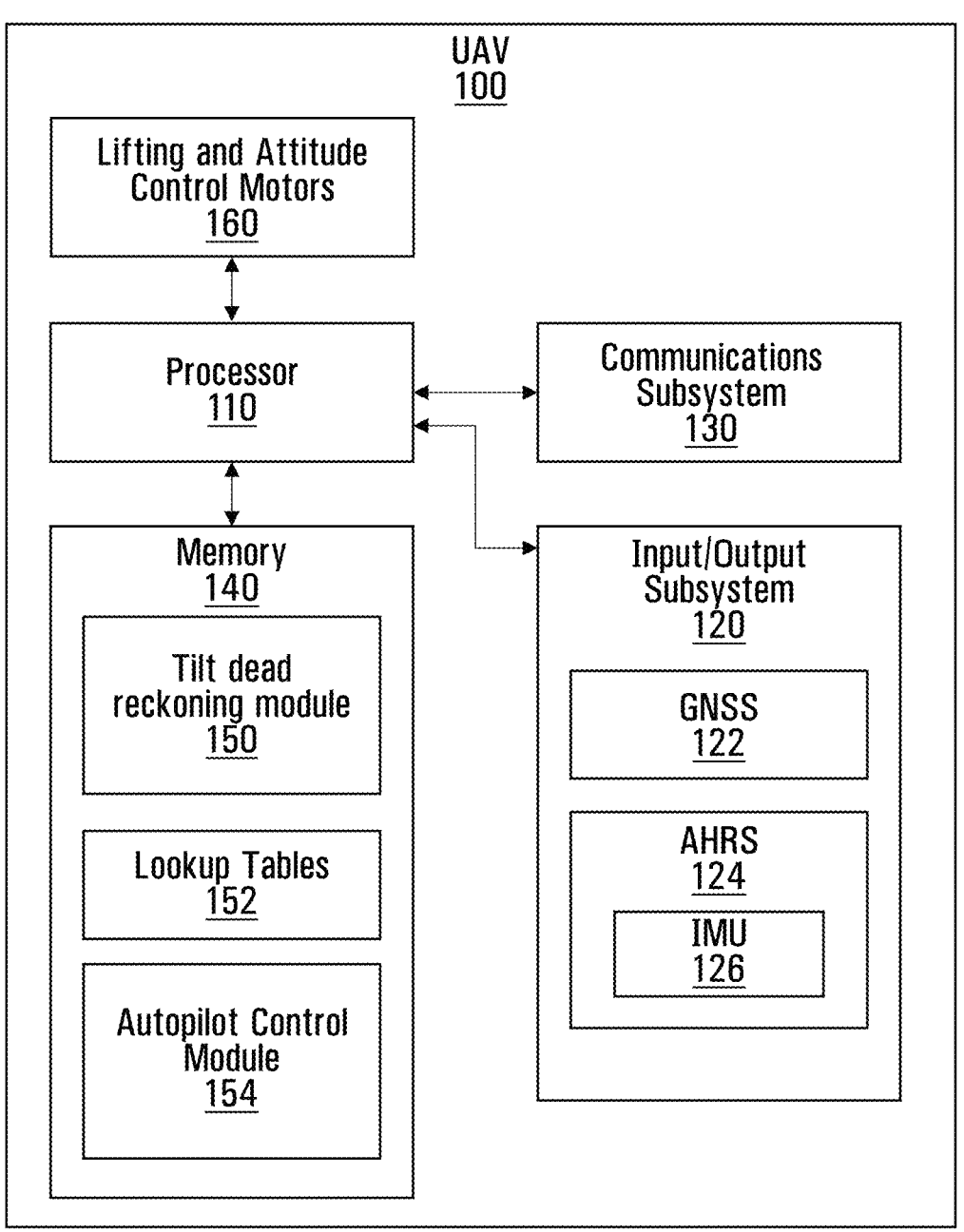
FIG. 1 is a block diagram of an unmanned aerial vehicle (UAV) in accordance with one example embodiment of the present disclosure.

FIG. 1 is a block diagram of the UAV in accordance with one example embodiment of the present disclosure. The UAV may be a hovering vehicle such as for example a helicopter, a multirotor vehicle and a vertical take-off and landing aircraft (VTOL) in hovering mode. The UAV 100 may include a processor 110 which controls the overall operation of the UAV 100. The processor 110 interacts with other device components such as an input/output subsystem 120, a communications subsystem 130, and a memory 140. The memory 140 may store various data and software modules such as for example a tilt dead reckoning module 150, one or more lookup tables 152 and, an autopilot control module 154. The input/output subsystem 120 may include for example a Global Navigation Satellite System (GNSS) system 122, an altitude heading reference system (AHRS) 124 and an inertial measurements unit (IMU) 126. The GNSS system 122 may also be referred to as a GNSS receiver. The IMU 126 may include various sensors such as for example accelerometers, gyroscopes and magnetometers. The measurements obtained by the IMU may assist in the navigation of the UAV 100. The UAV 100 also includes lifting and attitude control motors 160 that are used to effect movement of the UAV 100. In some embodiments, the UAV 100 may include additional software and hardware components not shown in FIG. 1, and may include different combinations of components in some embodiments.

The lookup tables can be created from data collected from one or more calibration flights. Flights consist of one or more passes where, during each pass, the UAV flies back and forth along a line at a constant altitude and velocity. During each pass along the line, the UAV accelerates to an equilibrium velocity, holds that equilibrium velocity for about ten seconds, and then decelerates to a stop. Passes are flown in alternate directions along the line, and the UAV's body X-axis is aligned with the line. During the calibration flights, the wind must be less than 2 kmph. Two passes, one in each direction, should be flown for 6 different equilibrium velocities varying from 5 kmph to the vehicle's maximum velocity. During the flight test, the UAV's body X-axis velocity and pitch are recorded. After the flight, the data is analyzed, and for each equilibrium velocity, the average pitch angle while the UAV was at the equilibrium velocity for that pass is calculated. The table is then constructed by taking these pitch angles and the velocities at which they were recorded and arranging them into a 12-entry table of six ascending velocities and pitch angles. The number of rows in the table can be increased or decreased if more or less accuracy is required.

A table that provides equilibrium roll from velocity in the Y-body axis can be determined by a similar process, with the exception that the vehicle travels along a line aligned with its body Y axis, the Y-body velocity is changed for each pass instead of the X-body velocity and pitch, and the vehicle's Y-body velocity and roll are recorded for each pass.

Alternatives to tables are equations developed from the tables using standard curve fitting techniques. Values that are not exact matches for the table or outside of the ranges of the tables should be used for interpolation or extrapolation to produce more accurate results.

In some embodiments, separate tables should be developed for X-body velocity and Y-body velocity as the UAV's drag may differ in these two axes. If the drag is identical, the tables can be combined into a single table that is used for both X and Y body axis.

The tilt dead reckoning module 150 includes one or more software programs that implement the methods of the present application. The methods of the present application provide tilt dead reckoning for the UAV 100. The tilt dead reckoning module 150 will implement the methods of the present application. The tilt dead reckoning module 150 is enabled via an option in the UAV's 100 stored configuration. In some embodiments it is configured by an "UAV integration engineer" who calculates the tables as part of the process of configuring the UAV 100. The tilt dead reckoning module 150 configures tables which convert pitch and roll angles of the UAV 100 to their corresponding constant airflow velocity in real time. The tables may be calculated using drag models for the UAV 100 or they can be measured by flying the UAV 100 at various speeds and measuring the angle necessary to achieve that speed. In some embodiments, the tables are calculated offline before flight and not updated in real time. In some embodiments the tables are updated on a continual basis. Without the updated tables, default tables may be used, however default tables will provide less accuracy for wind estimates and navigation.

Figure 2A:
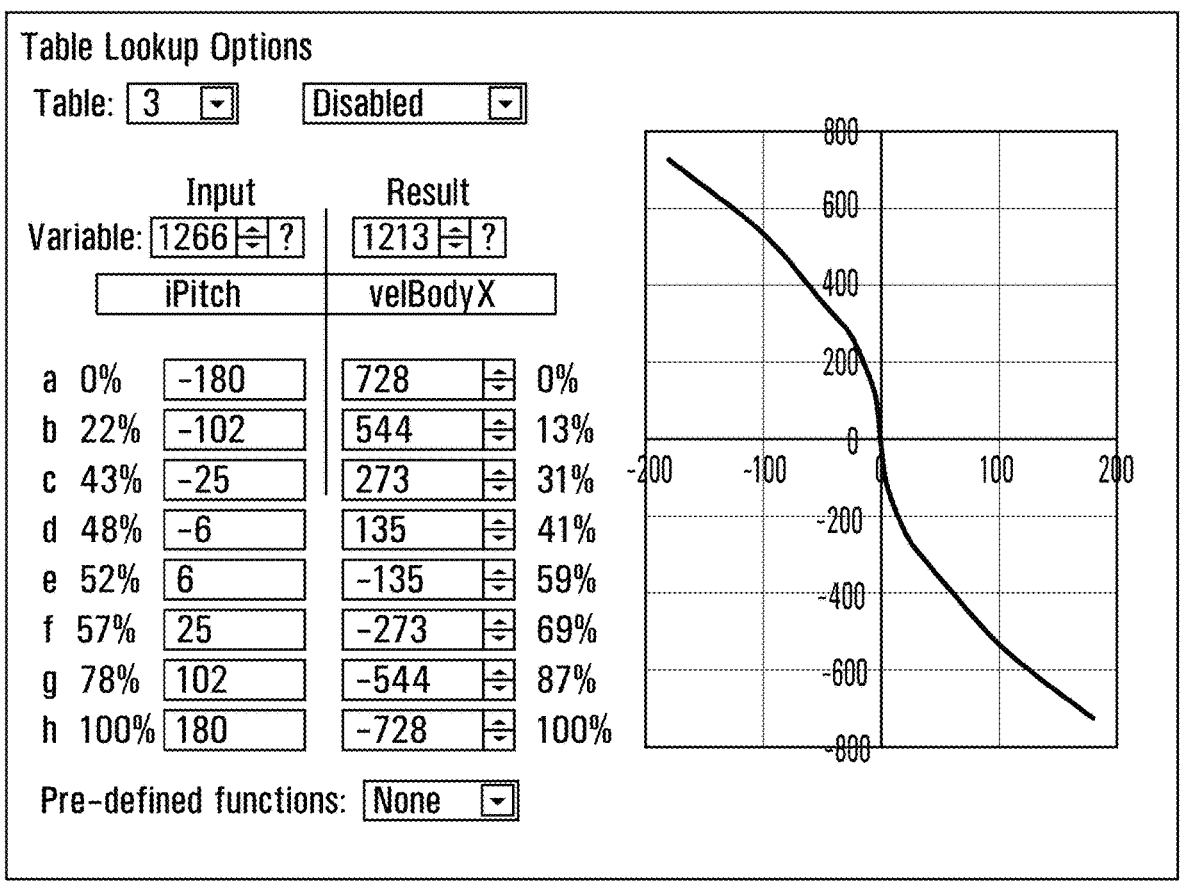
FIGS. 2A and 2B are example lookup tables in accordance with one example embodiment of the present disclosure.
Figure 2B:
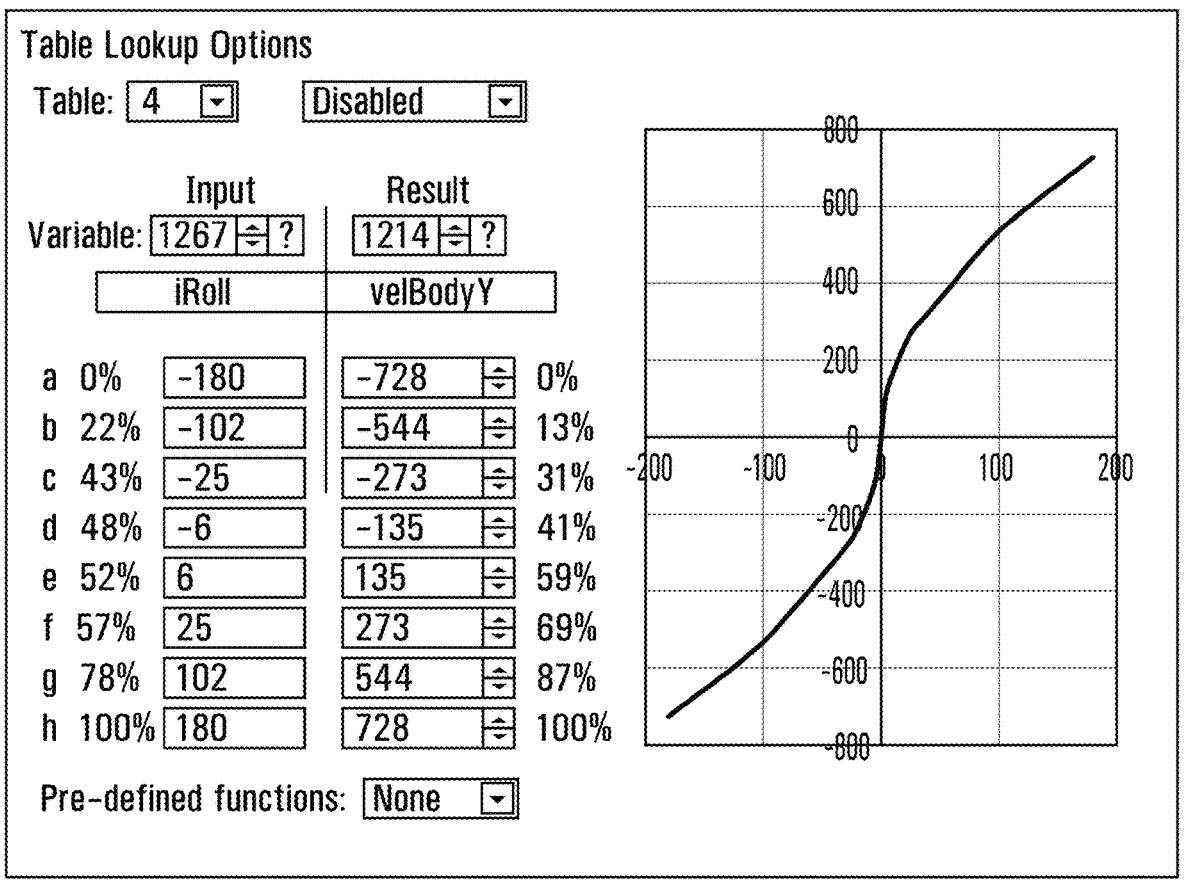

FIGS. 2A and 2B illustrate example lookup tables in accordance with an example embodiment of the present disclosure. FIG. 2A illustrates a lookup table for pitch angle versus X velocity and FIG. 2B illustrates a lookup table for roll angle versus Y velocity. In the example lookup tables, the measurement units are ft/s*8 for velocity and rad*1024 for pitch and roll angles.

Figure 3:
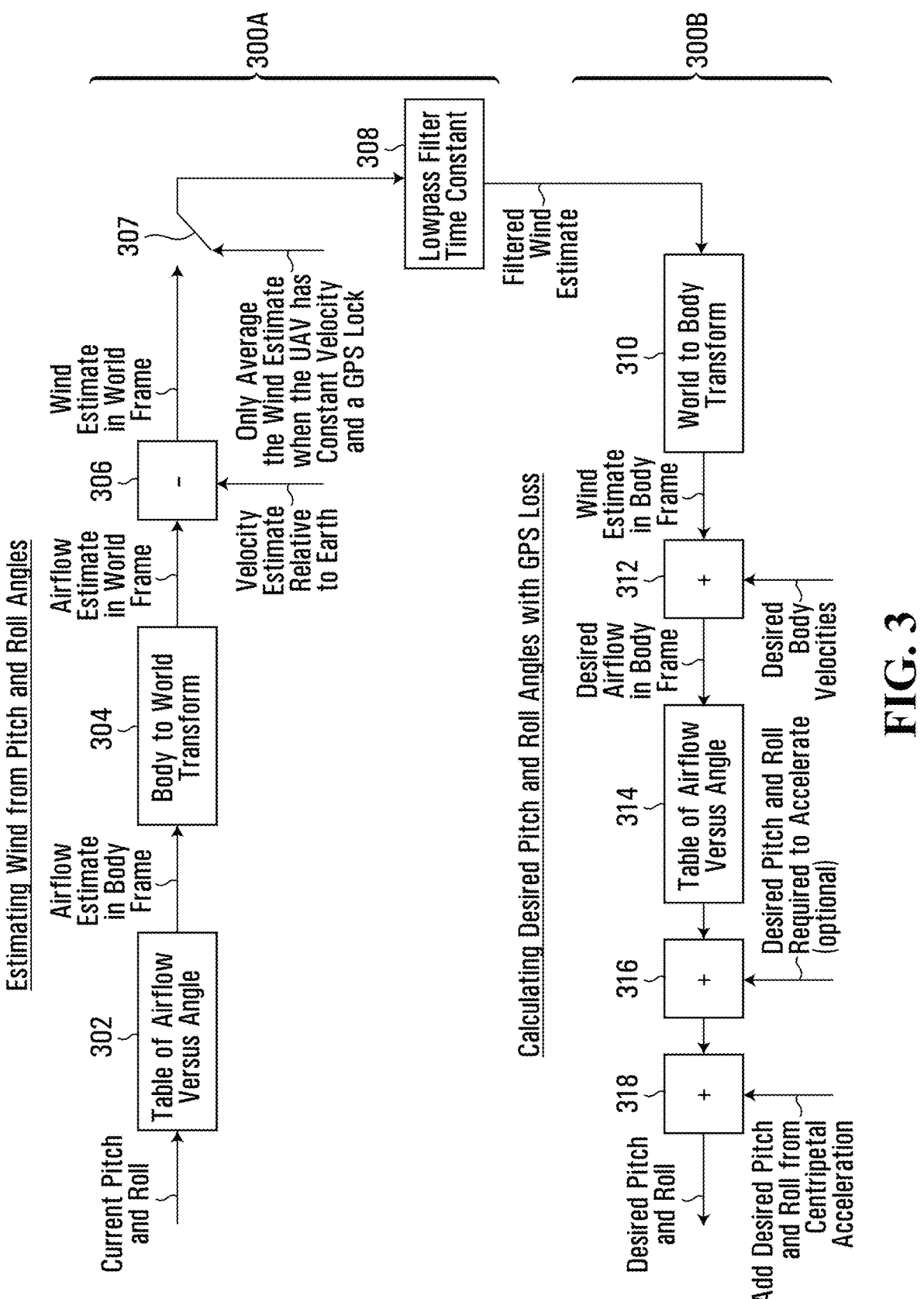
FIG. 3 is a flow chart of a method of estimating wind from pitch and roll angles, while GNSS signal is present, in accordance with one example embodiment of the present disclosure.

FIG. 3 is a flow chart of a method of estimating wind from pitch and roll angles in accordance with one example embodiment of the present disclosure. In the example embodiments of the present application body frame (e.g. local reference frame) refers to the motion of the UAV 100 according to the axes convention roll, pitch, yaw (RPY), and world frame (e.g. external reference frame) refers to the axes convention north, east, down (NED). The method 300 provides a way to determine a wind estimate. The method 300 begins when the autopilot 154 has access to the GNSS system 122. In other embodiments, a wind estimate may be provided from an external source such as for example a weather report or a portable weather station, may be assumed to be zero (e.g. indoor applications), or calculated in the same manner as with GNSS if there is a different position or velocity aiding source such as a vision system.

In FIG. 3, first the current pitch and roll angles in the body frame are inputted and converted to corresponding airflow velocities using calculated tables of airflow versus angles (block 302). In an embodiment, the current pitch and roll angles are estimated using the attitude heading reference system (AHRS) 124. The AHRS 124 may estimate the current pitch and roll may using an IMU 126 sensors, such as for example, by integrating the gyroscopes and correcting the estimates using the accelerometers and GNSS system 122 (when available.) The body airflow velocities are converted to the world frame (block 304). Then, a velocity estimate in the world frame is subtracted from the airflow estimate in world frame from block 304 to get the instantaneous wind estimate in the world axes (block 306). Block 307 averages the wind estimates only at predetermined times. In the example embodiment, the autopilot does not average the wind estimates during a non-steady-state maneuver because that will lead to an incorrect velocity estimate. In the example embodiment, the autopilot only averages the wind estimates during a steady-state maneuver because the instantaneous wind estimate taken from converting the pitch and roll angles to airflow velocity using the tables will be incorrect during a non-steady-state maneuver. A steady-state maneuver is defined as hovering or flying at a constant velocity, with acceleration under a threshold. If the pitch and roll angles of the vehicle are causing a thrust force in the horizontal plane parallel with the earth which is equal and opposite to the drag from the airflow, then the acceleration will be zero and the pitch and roll angles of the vehicle will match the pitch and roll angles in the table for the airflow velocity that the vehicle is experiencing. If the pitch and roll angles are causing a thrust force in the horizontal plane parallel with the earth which is different than the drag from the airflow, then there will be an acceleration, and the pitch and roll angles of the vehicle will not match the pitch and roll angles in the table for the airflow velocity that the vehicle is experiencing. As long as the acceleration is low, the pitch and roll angles of the vehicle will be close to the pitch and roll angles in the table for the airflow velocity that the vehicle is experiencing.

The accelerations, forces, and velocities used in these calculations can be expressed in any frame of reference provided that prior to being used in any addition or subtraction they are converted into consistent frames of reference. The most common, and convenient, frames of reference are the world and body axis. In the application world axis and body axis may also be referred to as world frame and body frame. Examples of consistent frames of reference for mathematical operations include velocities in world axis can only be added to, or subtracted from, other velocities in world axis, and velocities in body axis can only be added to, or subtracted from, other velocities in body axis. The transformation between different frames of reference is traditionally accomplished using Euler angles, however other representations, such as quaternions, are possible. The most convenient form of the tables to convert RPAS attitude into drag force or acceleration use pitch or roll as an input and generate acceleration or force in X and Y body axis as an output. At the expense of considerable extra complexity inputs other than pitch and roll could be used to the tables or formulae and would lead to the same result. Similarly, the tables or formulae could generate their results in other forms such as polar coordinates or world axis and again the result would be the same so long as the different forms are taken into account by the other supporting calculations.

If the autopilot has tables configured by the UAV integration engineer, then the wind estimate will be updated whenever the x and y body acceleration are both under +−1 ft/s/s (e.g. when the UAV is hovering or flying at a relatively constant velocity). If the autopilot is using the default tables, then the wind estimate will be updated only when the x and y body acceleration are both under +−1 ft/s/s, and the x and y body velocity are both under +−1 ft/s. This is because if the default tables are used, the autopilot cannot accurately determine how much of the pitch and roll angle is due to wind and how much is due to the velocity relative to the ground. Only estimating wind when stationary (e.g. hovering) allows the default tables to work and allow the vehicle to hover after GNSS is lost, as long as the wind stays relatively constant. If the tables of airflow velocity versus pitch/roll angle are set for the body frame (e.g. airframe), then the autopilot can average the pitch and roll angles as long as it is hovering or at a constant velocity. Next, a lowpass filter is applied to the wind estimates and the lowpass filtered wind estimate fields are set (block 308). In some embodiments, the wind estimate could also be measured from local instruments or could be downloaded from weather forecasts available on the internet.

In another example embodiment as shown in FIG. 3, when the UAV loses GNSS, method 300B proceeds in the following manner to calculate desired pitch and roll angles to use during GNSS loss. The wind estimate from the world frame is transformed back to the body frame (block 310). Desired body velocities relative to the ground are added (block 312), resulting in desired airflow velocities in the body frame. The desired body velocities relative to the ground may be determined from fly file commands, the UAV position estimate or other autopilot commands. The desired airflow velocities in the body frame are converted to pitch and roll angles to use for desired pitch and roll (block 314). Other desired pitch and roll terms for acceleration/deceleration and coordinated turns may be added (blocks 316, 318). Because method 300B has an input for desired body velocities, the desired pitch and roll angles may be determined based on the autopilot's instruction, for example desired target location. The function (blocks 312, 314) to set the desired pitch and roll based on the wind estimate will add in the desired body velocities relative to the ground to the desired airflow velocity used to calculate the pitch and roll angles. For example, take the scenario where the autopilot is hovering towards a location, the target forward flight speed is 10 m/s and there is a 2 m/s tail wind. The desired airflow velocity in the forwards direction would be (10−2)=8 m/s. The value of 8 m/s would be looked up in the table of pitch angles and the corresponding desired pitch angle would be used. The pitch angle would be the angle that the vehicle must hold in order to avoid accelerating in a constant 8 m/s airflow. The behavior from commanding that constant desired pitch angle will be that the UAV would accelerate slowly and settle in a steady state approximately at the desired velocity. Desired pitch and roll angles required to accelerate may be added to the desired pitch and roll angles (block 316) in order to accelerate to the desired velocity more quickly. If the autopilot is commanded to perform a coordinated turn, then feedforward angles will be added to the desired pitch and roll (block 318) in order to generate the necessary centripetal acceleration required to hold a coordinated turn, based on the vehicle's velocity and turn rate. The desired velocities will come from fly file commands as usual if the vehicle is in forward flight. If the vehicle is hovering, then the desired velocities may be set from a control loop using the error between the position estimate and desired position as an input.

Figure 4:
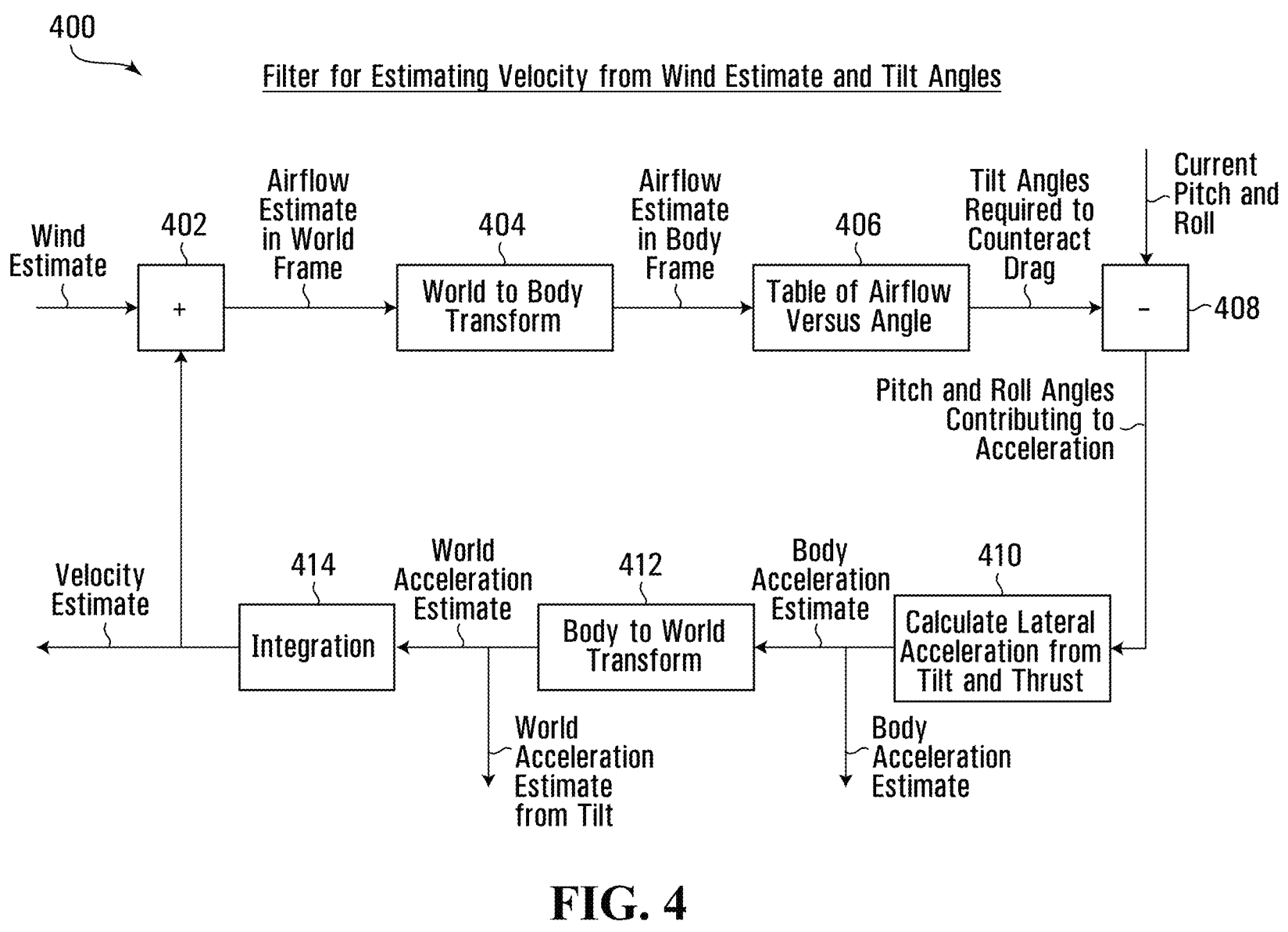

FIG. 4 is a flow chart of a method 400 of estimating velocity from wind estimate and tilt angles in accordance with one example embodiment of the present disclosure. In other embodiments, the method 400 may estimate both velocity and position. The method 400 performs a dead reckoning estimate of position and velocity based on tilt angles. The tilt angles, recent wind estimate from before GNSS was lost, and previous velocity estimate are used to estimate the current velocity, The method 400 uses the most recent wind estimate, calculated prior to loss of GNSS signal, from the output of 308 (e.g. see FIG. 3), however in other embodiments the wind estimate may also come from an external source such as a weather report or portable weather station, or may be assumed to be zero. The wind estimate is added to the previous velocity estimate to obtain an airflow estimate in world frame (block 402). The airflow estimate from the world frame is transformed to the body frame to get the estimated airflow velocity relative to the UAV (block 404). The airflow velocity is used with the tables to estimate the pitch and roll angles required to hold position against the airflow (block 406). The difference between the current pitch and roll angles and the angles to hold against the wind is calculated (block 408). The current pitch and roll angles may be estimated from the AHRS 124 (or IMU 126) sensors. Then, lateral acceleration from tilt and thrust is calculated. Unless the UAV is accelerating in the world Z axis, the combined force produced by all rotors in the world Z axis balances gravity. Using this fact and trigonometry it is possible to calculate a lateral acceleration based on the vehicle's pitch and roll angles. In the case where the vehicle is accelerating in the world Z axis, this acceleration can be measured to calculate and using the same trigonometry used to adjust the lateral acceleration to remove its effect (block 410). The body acceleration estimate is transformed to the world frame to get the estimated world acceleration estimate (block 412). The estimated world acceleration can be integrated to give a velocity estimate (block 414). The velocity estimate may be integrated to give a position estimate. The velocity and position estimates obtained using method 400 are used by the autopilot module to determine control surface deflections or multirotor motor commands. For example, the position estimate may be compared with the desired position in order to calculate desired velocities. The velocity estimate may be compared with the desired velocities to calculate desired pitch and roll angles. The desired pitch and roll angles are compared to current pitch and roll angles to calculate either the control surface deflections or desired pitch and roll rates. If desired pitch and roll rates are calculated, then they are compared with the current pitch and roll rates to give the control surface deflections or multirotor motor commands. There can be some differences based on control mode, for example the position may be ignored and the control may come from desired velocity directly.

FIG. 4 uses a small angle approximation to simplify the calculation. In another embodiment, an improvement in accuracy could be obtained by calculating accelerations directly. In this case the tables (block 406) would lookup an equilibrium acceleration instead of angles and the UAV's current pitch and roll are converted into accelerations, using the method described above (block 410). The two accelerations are subtracted (block 408) and are then transformed from body to world coordinates (block 412) and the rest of the calculation proceeds as described by method 400.

In addition to using tables or functions to determine angles or accelerations, the tables or functions could also calculate forces. The calculations would proceed in a similar fashion as described in FIG. 4 with the disadvantage that the mass of the UAV is required to convert force into acceleration.

An advantage of method 400 of the present application is that it allows the UAV to come to a stop more accurately at a waypoint than a method using an open-loop command of desired pitch and roll angle based on desired velocity. Another advantage of method 400 of the present application is that it allows a more accurate estimation of the velocity and position of the UAV compared to directly calculating the velocity estimate from the current pitch and roll angles using the tables, even when the autopilot commands a fast deceleration in order to come to a stop more quickly.

Figure 5:
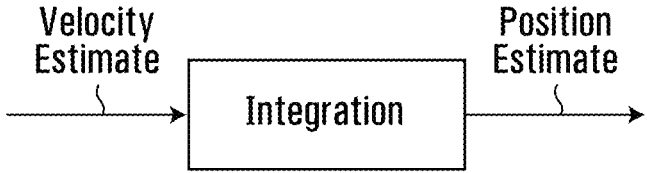
FIG. 5 is a block diagram for estimating position from estimated velocity in accordance with one example embodiment of the present disclosure.

FIG. 5 is a block diagram for estimating position from estimated velocity in accordance with one example embodiment of the present disclosure.

An example first use case in accordance with an embodiment of the present application is provided where the UAV 100 loses GNSS signal while hovering and flies to a safe ditching area and the UAV is ditched. In this example use case, the autopilot of the UAV is in a hovering mode, and the tilt dead reckoning module 150 utilizes configured tables 152 for airflow velocity versus pitch and roll angles. The first step in the example use case is the wind estimate being updated, prior to loss of GNSS signal, by taking the current pitch and roll angles and translating them to the corresponding airflow velocities using the method 300A. Once the autopilot loses GNSS signal, the autopilot calculates the desired pitch and roll angle required to hover based on the wind estimate (e.g. the current wind estimate or last wind estimate prior to GNSS loss) and tables of airflow velocity versus pitch and roll angle using the method 400. The autopilot receives a command (e.g. from an operator) to turn towards the ditching area and starts to change heading. The desired pitch and roll angles calculated to hover in the wind are adjusted as the heading changes (repeating method 400). The autopilot sets a desired forward velocity to fly to the ditching area. The autopilot calculates a desired pitch angle based on the difference between the desired velocity and current velocity estimated from method 400. The autopilot replaces the position and velocity estimate from the Kalman Filter (e.g. method 400) with the estimate based on pitch and roll angles and airflow tables. The autopilot uses a navigation command to compare the desired location to the estimated location and goes to the next command in the command buffer which stops the engine. The autopilot then crashes the UAV safely in the ditching area.

An example second use case in accordance with an embodiment of the present application is provided where the UAV 100 calculates wind estimates while flying between waypoints prior to the loss of GNSS signal. In this example use case, the autopilot of the UAV is flying between waypoints, the 'tilt dead reckoning' option is enabled, and the tilt dead reckoning module 150 has configured tables for airflow velocity versus pitch and roll angles. The first step in this example use case has the autopilot flying between waypoints with constant velocity. The wind estimate is updated by taking the current pitch and roll angles and translating them to the corresponding airflow velocities and subtracting the velocity relative to ground using method 300A. The autopilot comes to a stop, turns, or accelerates. The wind estimate is no longer estimated when the velocity is not constant (block 307 of method 300). The autopilot regains flying at a constant velocity and the wind estimation resumes being updated using the method 300. This use case illustrates that the wind estimate is not adversely affected by the UAV flying with changing velocity.

An example third use case in accordance with an embodiment of the present application is provided where the UAV 100 has GNSS loss and there are no airflow velocity tables configured. In this example use case, the autopilot of the UAV is hovering, the 'tilt dead reckoning' option is enabled, and the tilt dead reckoning module 150 does not have configured tables for airflow velocity versus pitch and roll angles. The first step in the example use case has the autopilot of the UAV hovering. As the UAV integration engineer has not configured tables for airflow versus angles, the wind estimate is updated, prior to loss of GNSS signal, by taking the current pitch and roll angles and translating them to the corresponding airflow velocities using a default tables method using method 300A. The wind estimate accuracy will be reduced because default tables are used. The heading of the wind will be within the correct quadrant at least, but its magnitude will be off by a constant factor. The autopilot turns in place. The wind estimate will change during the turn if the vehicle's drag is not symmetrical since the autopilot is using default drag tables. For example, if a 5 degree pitch is required to hold against the wind but only a 4 degree roll is required and the vehicle turns from a headwind to a side wind, the wind estimate will change by 25%. The autopilot loses GNSS signal and saves the wind estimate from before GNSS signal was lost. The autopilot calculates the desired pitch and roll angle required to hover based on the wind estimate using method 400. The autopilot follows a command to fly to a ditching area. The autopilot accepts the navigation command but will navigate with reduced accuracy because it does not know how to correctly map the desired velocity to desired angles. The autopilot reaches the ditching area with worse accuracy than defined in the goal of less than 20% error since default tables had to be used instead of updated airflow velocity versus pitch and roll angles.

The minimum rate at which to execute the calculations in methods 300B and 400 depend on the vehicle dynamics and control system properties. If the calculations are executed too slowly, they can result in unstable control or oscillations. If the calculations in method 300A are executed too slowly, they can result in reduced accuracy in the wind speed estimates. Unless the vehicle has an exceptionally high frequency response, a 30 Hz update rate is more than adequate to perform the methods of the present application. The update rate should be verified by flight test and comparing the position estimated with the actual position, and by checking for oscillations in the pitch, roll, velocity and position PID loops that are not present in those loops when a GNSS lock is available.

The methods of the present application may not account for a change in wind speed after the loss of GNSS signal and such occurrence will directly affect the accuracy of navigation. The accuracy of the navigation methods of the present application may be limited by the accuracy of the tables for airflow velocity versus pitch and roll angle. The autopilot of the UAV 100 may only estimate wind and navigate via tilt angles if the UAV 100 does not use a forward-facing propeller to hold position against the wind with zero pitch because the autopilot does not know how much thrust the propeller is generating. Lastly, the methods of the present application do not attempt to control velocity so as to prevent damage on landing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A method of hovering dead reckoning for GNSS (Global Navigation Satellite System) denied navigation of unmanned aerial vehicles (UAV) having fixed lifting rotors while hovering, the method comprising:
   estimating a wind velocity;
   determining the UAV's pitch and roll;
   converting the UAV's estimated velocity, added to the wind velocity, into a lateral equilibrium force using one or more tables or formulas;
   calculating a lateral acceleration of the UAV;
   integrating the lateral acceleration into a change in velocity of the UAV;
   updating the UAV's estimated velocity by adding the change in velocity of the UAV;
   integrating the UAV's updated estimated velocity to obtain a position estimate of the UAV;
   providing the position estimate of the UAV to a navigation system; and
   controlling the UAV using the updated velocity and the position estimate.

2. The method of claim 1, wherein the step of calculating the lateral acceleration includes calculating lateral acceleration from the determined UAV pitch and roll angles and then subtracting the lateral equilibrium force converted into an acceleration using the UAV's mass.

3. The method of claim 1, where the step of calculating the lateral acceleration includes:
   calculating a lateral force from the determined UAV pitch and roll and UAV mass, and then subtracting the lateral equilibrium force;
   converting the resulting lateral force into a lateral acceleration by dividing by the UAV mass.

4. The method of claim 1 wherein the lateral equilibrium force is calculated from the UAV's pitch and roll using one table or formula for the UAV's estimated velocity.

5. The method of claim 1 wherein the lateral equilibrium force is calculated from the UAV's pitch and roll using two tables or formulas, one for the UAV's X velocity and one for the UAV's Y velocity.

6. The method of claim 1, where the step of estimating the wind velocity is performed prior to loss of GNSS signal and includes:

converting the UAV's pitch and roll to an estimated airflow velocity in a body frame;

transforming the estimated airflow velocity to a world frame;

subtracting a velocity estimate in the world frame from the estimated airflow velocity in the world frame to estimate the wind velocity in the world frame; and applying a low-pass filter to the estimated wind velocity to determine a filtered wind velocity.

7. The method of claim 6, wherein the wind estimate is based on the estimated airflow velocity when the UAV is hovering, moving at a constant speed or accelerating.

8. A method of dead reckoning for GNSS (Global Navigation Satellite System) denied navigation of unmanned aerial vehicles (UAV) having fixed lifting rotors while hovering, the method comprising:

estimating a wind velocity;

measuring the UAV's pitch and roll;

converting the UAV's estimated velocity, added to the wind velocity, into an equilibrium pitch and roll using one or more tables or formulas;

calculating an excess pitch and roll by subtracting the calculated equilibrium pitch and roll from the measured pitch and roll;

calculating an acceleration from the excess pitch and roll;

integrating the acceleration into a change in velocity of the UAV;

updating the UAV's estimated velocity by adding the change in velocity of the UAV;

integrating the UAV's updated estimated velocity to obtain a position estimate of the UAV;

providing the position estimate of the UAV to a navigation system and controlling the UAV using the updated velocity and the position estimate.

9. The method of claim 8, where the step of estimating the wind velocity is performed prior to loss of GNSS signal and includes:

converting the UAV's pitch and roll to an estimated airflow velocity in a body frame;

transforming the estimated airflow velocity to a world frame;

subtracting a velocity estimate in the world frame from the estimated airflow velocity in the world frame to estimate the wind velocity in the world frame; and applying a low-pass filter to the estimated wind velocity to determine a filtered wind velocity.

10. The method of claim 9, wherein the wind estimate is based on the estimated airflow velocity when the UAV is hovering, moving at a constant speed or accelerating.

11. An unmanned aerial vehicle (UAV), the UAV comprising:

fixed lifting rotors while hovering;

a processor;

a memory for storing one or more tables having expected airflow velocity for different pitch and roll angles;

the processor being configured to:

estimate a wind velocity;

determine the UAV's pitch and roll;

convert the UAV's estimated velocity, added to the wind velocity, into a drag acceleration using one or more tables or formulas;

calculate an acceleration from the determined UAV pitch and roll and then subtracting the drag acceleration;

integrate the acceleration into a change in velocity of the UAV;

update the UAV's estimated velocity by adding the change in velocity of the UAV;

integrate the UAV's updated estimated velocity to obtain a position estimate of the UAV;

providing the position estimate of the UAV to a navigation system; and control the UAV using the updated velocity and the position estimate.

12. The UAV of claim 11, wherein the drag acceleration is calculated from the UAV's pitch and roll using one table or formula for the UAV's velocity.

13. The UAV of claim 11, wherein the drag acceleration is calculated from the UAV's pitch and roll using, a first table or formula for the UAV's X velocity and a second table or formula for the UAV's Y velocity.

* * * * *